Dec. 9, 1952  J. W. O'KELLEY  2,621,055
ADJUSTABLE VEHICLE CARRIER FOR PORTABLE SAWMILLS OR THE LIKE
Filed March 31, 1947  3 Sheets-Sheet 1
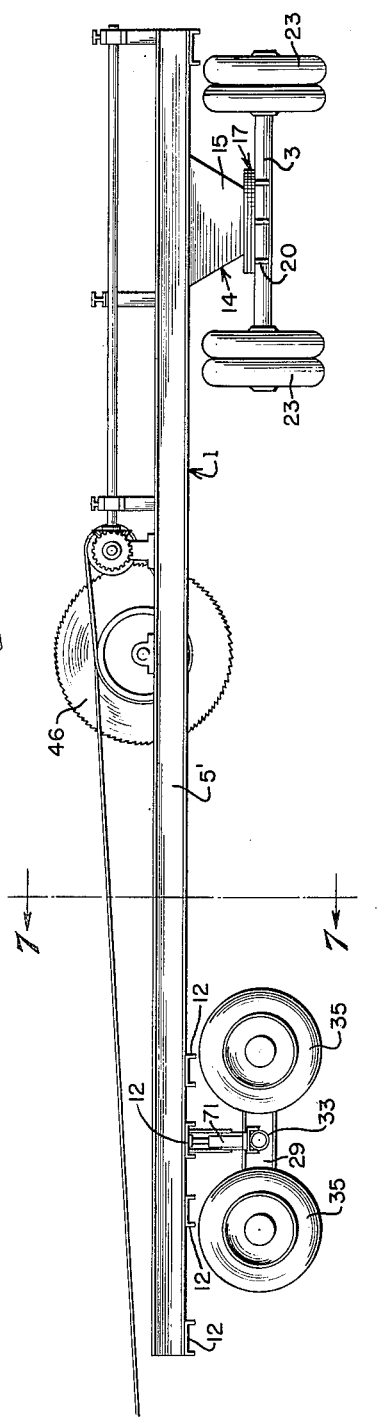
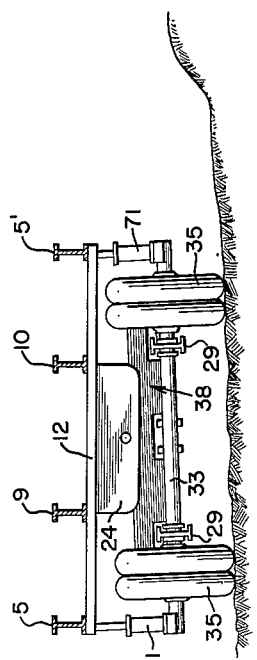
INVENTOR.
JOHN WILLIAM O'KELLEY
BY
Mason, Fenwick & Lawrence
ATTORNEYS

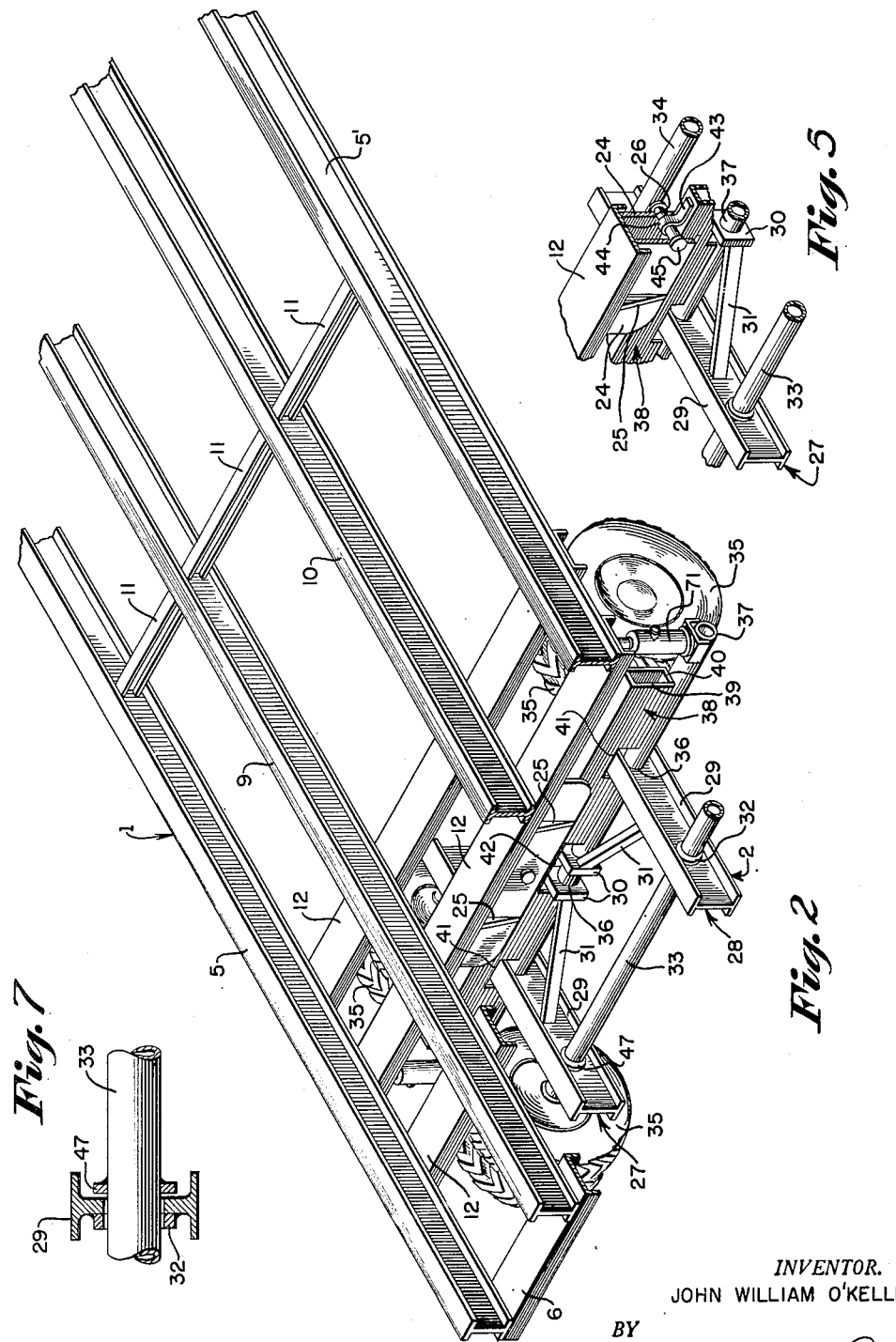

Dec. 9, 1952 J. W. O'KELLEY 2,621,055
ADJUSTABLE VEHICLE CARRIER FOR PORTABLE SAWMILLS OR THE LIKE
Filed March 31, 1947 3 Sheets-Sheet 3
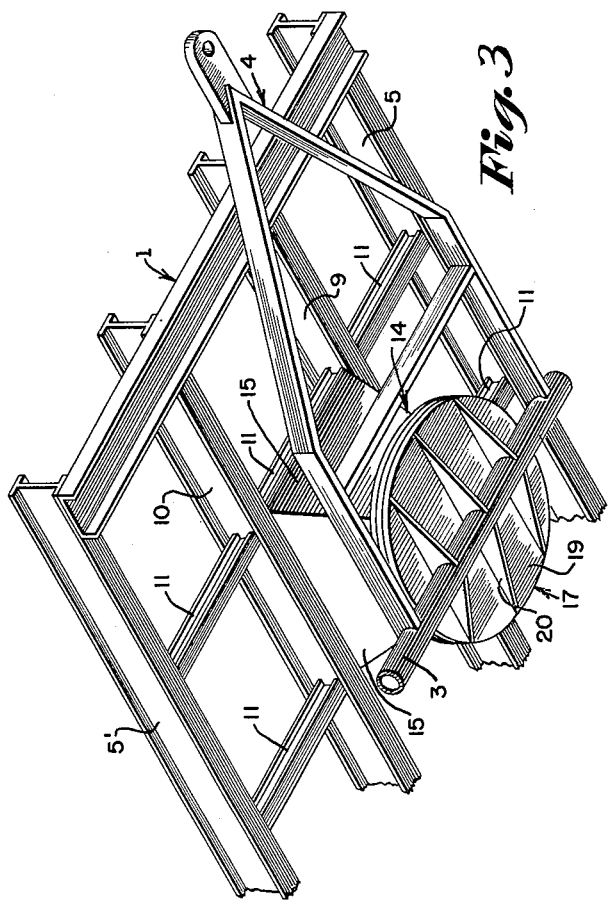
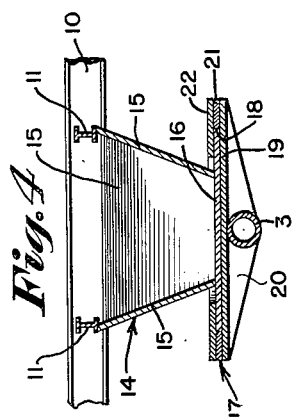
INVENTOR.
JOHN WILLIAM O'KELLEY
BY
ATTORNEYS Patented Dec. 9, 1952

2,621,055

UNITED STATES PATENT OFFICE 2,621,055

ADJUSTABLE VEHICLE CARRIER FOR PORTABLE SAWMILLS OR THE LIKE

John William O'Kelley, Owens Wells, Miss.

Application March 31, 1947, Serial No. 738,270

5 Claims. (Cl. 280—6)

This invention relates to an adjustable vehicular carrier for a portable sawmill.

One of the objects of the invention is to provide a vehicle of the class described, upon which a portable sawmill may be mounted, which will expeditiously move the sawmill into areas of felled timber, and by which the sawmill may be moved in rapid and easy succession from place to place in such area as the timber is progressively sawed up, and which may be quickly and easily adjusted to form a firm and level foundation for the sawmill during its operation, regardless of the unevenness of the terrain, without the usual necessity of dismounting the sawmill or removing the wheels from the carrier.

More specifically stated, it is an object of the invention to provide in a portable sawmill carrier, a frame rockably mounted at the rear about a longitudinal medial axis and capable of being leveled by means of jacks mounted on the vehicle at opposite sides, including a fifth-wheel construction restricted to move in a plane parallel to the axis of the front axle, so that when the front axle is transverse, in the position of traveling, the fifth-wheel resists rocking or tilting of the frame, while when the front axle is turned to lie in the medial longitudinal vertical plane of the carrier, it substantially forms a front continuation of the rocking axis, facilitating the leveling of the frame by the jacks, without straining the frame.

Other objects of the invention will appear as the following description of a preferred and practical embodiment thereof proceeds.

In the drawings throughout the figures of which the same reference characters have been used to denote identical parts:

Figure 1 is a side elevation of the vehicular sawmill carrier, omitting the log chain skids;

Figure 2 is a perspective view of the rear portion;

Figure 3 is a worm's eye view, in perspective, showing particularly the fifth wheel construction;

Figure 4 is a vertical cross-section through the fifth wheel;

Figure 5 is a fragmentary view in perspective, showing the tilting bolster construction;

Figure 6 is a cross-section taken along the line 7—7 of Figure 1;

Figure 7 is a fragmentary view in section showing structure associated with the rear axle bearings.

Referring now in detail to the drawings, the sawmill carrier comprises in general, a frame 1, supported at the rear upon a four-wheeled truck 2, and at the front upon a centrally pivoted two-wheeled axle 3, having a rigid base 4, extending forwardly therefrom, with a hole or its equivalent at the front end, for the attachment of a tractor coupling.

The frame 1 is of rectangular shape, comprising side member 5 and 5', and end members 6 and 7, with intermediate longitudinal members 9 and 10, secured to the end members. Cross supports 11 and 12 are shown, arranged transversely at intervals, and secured to the longitudinal members, preferably at their under side. The cross member 12 is arranged above the middle of the four-wheeled truck 2 for a purpose which will appear, and is preferably a channel beam with the channel facing downwardly.

Projecting beneath the forward part of the frame 1 is a bolster 14, which as shown, is frusto-pyramidal in shape with its smaller base downward, formed of trapezoidal plates 15, welded together at their lateral edges, and at the top edges to the contiguous members of the frame. A circular plate 16 is welded to the base edges of the bolster, centered with respect thereto and in a plane parallel to the plane of the frame. Said plate constitutes one of the fifth-wheel members.

The axle 3 has a circular turntable 17 of relatively large diameter centrally positioned on the top side thereof and secured thereto as by welding. Said turntable is the complimentary member of the fifth-wheel and has an annular channel 18, open on its inner side, into which the peripheral margin of the circular plate 16 extends and rotates, and by which it is retained. The turntable may be made up of a circular plate 19, welded to the axle 3, reinforced beneath by the plates 20, welded to the under side thereof and to the axle, a narrow annular spacing ring 21 and a wider retainer ring 22, both of which rings may have the same external diameter as the plate 19, and welded together. The retaining ring may, of course, be fixed after the plate 16 has been positioned in the turntable. The axle 3 is thus nonrotatably secured, the vehicle wheels 23 rotating on the axle.

Adverting now to the rear portion of the frame, the cross channel beam 12 has a pair of similar spaced parallel bolster plates 24 forming a bolster support, welded to the under side of the web of said channel beam and inset with respect to the flanges thereof, symmetrically positioned relative to the longitudinal vertical medial plane of the frame 1 and being braced by iron braces 25, welded to the outer faces of said plates and to the overhanging portion of the channel beam. At a distance from their lower edges in said medial plane, the plates 24 are provided with aligned holes 26.

The four-wheeled truck 2 comprises a pair of similar oppositely positioned rigid wheel supporting frames 27 and 28, which have a limited independent oscillatory movement about a common transverse axis. Each of these frames comprises an outer side beam 29, a small inner plate 30, and oblique struts 31, convergent symmetrically with respect to the center line of the frame, and which rigidly connect the side beam with the plate 30, the side beams having aligned bearings 32 near their ends, equidistant from their centers, through which the axles 33 and 34 which carry the vehicle wheels 35 freely pass. The side beams 29 are preferably of I-cross-section and the axles have welded washers 47, against which the webs of the side beams abut to properly space the side beams apart on the axles.

The side beams and plates 30 are provided with aligned holes 36, through which a heavy tubular cross member 37 freely extends, said tubular member projecting outwardly beyond both of the side beams. When the vehicle is traveling over uneven ground, the frames 27 and 28 may independently tilt about the tubular cross member 37, this being permitted by the tolerance between the axles 33 and 34 and the bearings 32, in which they are journaled.

A rear bolster 38 fits down over the wheel supporting frames 27 and 28, resting upon the tubular cross member 37, and being welded to the top thereof. This bolster is preferably formed of two similar angle members 39 and 40, with their open ends confronting and welded together along the longitudinal edges of their adjacent flanges, forming a box girder. The lower side of the bolster 38 is formed with the recesses 41 near its ends and the recess 42 at the middle. These recesses fit over the side beams 29 and the plates 30 with clearance, so as to permit the oscillation of the wheel supporting frames.

A strap 43 formed with an inverted U-shaped channel 44 is welded to the top of the bolster 38, the channel forming a pin receiving socket. The width of the bolster is slightly less than the width of the space between the bolster plates 24, so that the bolster can enter between the bolster plates sufficiently far to bring the pin holes 26 into registry with the channel 44. A headed pin 45 is slipped through the aligned passages and may be spot-welded to one of the plates 24 to keep it in place. The pin forms a longitudinal axis about which the frame 1 rocks in the operation of leveling it. The tubular cross member 37 is nonrotatable by virtue of its being welded to the bolster 38, and it is directly beneath the channel beam 12, said channel beam overhanging the projecting ends of said tubular cross member. Jacks 71, which are preferably of the hydraulic type, are secured to the top faces of said projecting ends and have their upper ends in free contact with the end portions of the channel beam 12. By raising or lowering the respective jacks, the frame 1 may be tiltably adjusted about its rocking axis.

The manner of operating the mobile adjustable vehicular carrier is as follows:

In conducting timber operations on rough or sloping ground, the mobile adjustable carrier is placed crosswise of the sloping axis of the hill. In this position, the frame 1 with the sawmill mounted thereon, will be slanting in a transverse direction, down the slope of the hill. In order to place the frame in a level position, and to make ready for operation of the mill, the front wheels will be cut by the tractor so that the front axle will be parallel with the length of the carrier and parallel to the axis of the pin 45. The hydraulic jack on the upslope side will then be lowered and the hydraulic jack on the downslope side will be raised and thus by means of the correlated operation of the hydraulic jacks, the frame of the adjustable carrier will be leveled, the rear of said frame turning upon the pin 45, and the front of the frame will turn on the axis of the front axle relative to the front vehicle wheels, or approximately on said axis. In the embodiment illustrated, in which the front axle is slightly lower than the pin 45, the prolongation of the axis of said pin will pass above the front axle. This deviation from true alignment is compensated by slight rolling of the front vehicle wheels under the tilting effort, until the true axis of tilt is in the middle longitudinal plane perpendicular to the plane of the frame 1.

The hydraulic jacks, thus adjusted, hold the frame of the mobile adjustable carrier in a secure and level position so that after the wheels have been chocked, the operation of the sawmill, mounted on said frame, may then be commenced.

When the sawing at any particular location is completed, the frame of the carrier is turned into a position parallel with the slope of the ground by adjustment of the hydraulic jacks, the front wheels are cut back into traveling position, and the carrier is ready to be pulled by truck or tractor onto a new location for further work.

While I have in the above description disclosed what I believe to be a preferred and practical embodiment of the invention, it will be understood by those skilled in the art that the specific details of construction and arrangement of parts as disclosed, are illustrative of the principles of the invention and not to be construed as limiting its scope.

What I claim as my invention is:

1. Vehicular carrier for a portable sawmill or the like comprising a rigid frame including longitudinal side members, a wheeled truck beneath the rear portion of said frame in supporting relation thereto, a longitudinal pivot in a medial longitudinal plane perpendicular to said frame and connecting said frame to said truck, permitting transverse rocking of said frame about said pivot, said truck including a cross member the ends of which extend beneath the side members of said frame, a bolster rigidly connected to the under side of said frame at the front, a centrally pivoted front axle beneath said bolster, vehicle wheels journaled on said front axle and of such diameter as to permit said front axle to swing under said frame, a fifth wheel connecting said bolster and axle comprising a circular plate rigid with said bolster and a complementary circular plate rigid with said axle, said plates being of relatively large diameter providing flat engaging faces upon which one rotates relative to the other, one of said plates having a peripheral channel closely embracing the peripheral edge of the other, retaining said plates in close interfacial contact so that when said axle is swung to a position in which its axis is in said medial longitudinal plane, lateral tilt of the frame is solely about the axis of the axle, and jacks reacting between the side members of said frame and said cross member of the truck.

2. Vehicular carrier for a portable sawmill or the like comprising a rigid frame, a wheeled truck supporting the rear of said frame, a longitudinal pivot in a medial longitudinal plane perpendicular to said frame, connecting said frame to said truck, permitting rocking of said frame about said pivot, a centrally pivoted wheeled axle supporting the front of said frame, a front bolster carried by said frame, a fifth-wheel member rigid with said bolster, a complementary fifth-wheel member rigid with said axle and having a guiding channel closely surrounding and retaining said first named fifth-wheel member, whereby said frame is inhibited from rocking relative to said axle, the latter being adapted to be turned until its axis lies substantially in said medial plane, limiting the rocking of said frame substantially to movement about said axis, and jacks between said truck and frame, oppositely laterally positioned with respect to said longitudinal pivot, for leveling said frame.

3. Vehicular carrier for a portable sawmill or the like comprising a rigid frame, a front bolster and a rear bolster support rigid therewith, projecting downward from said frame, a truck having spaced wheel carrying axles supporting the rear of said frame, said truck including a bolster, a longitudinal pivot in a medial longitudinal plane perpendicular to said frame connecting said rear bolster to said bolster support permitting rocking of said frame about said pivot, a wheeled axle supporting the front of said frame pivotally connected at the center to said front bolster about an axis in said medial plane perpendicular to the axis of said longitudinal pivot, said pivotal connection comprising a fifth-wheel including complementary members, interlocked to limit relative rotation of said member to a single plane, one of said members being rigid with said axle the other rigid with said front bolster, said front axle being turnable upon its pivotal axis until it lies substantially in said medial plane, and jacks carried by said truck laterally of said longitudinal pivot and on opposite sides thereof, said jacks freely engaging said frame at overlying points, for leveling said frame.

4. Vehicular carrier for a portable sawmill or the like comprising a rigid frame, a front bolster and a rear bolster support rigid therewith and projecting downwardly from said frame, a wheeled axle supporting the front of said frame pivotally connected at the center to said front bolster about an axis in a medial longitudinal plane perpendicular to said frame, said pivotal connection comprising a fifth-wheel including complementary members interlocked to limit relative rotation to a single plane, one of said members being rigid with said axle the other rigid with said bolster, said front axle being turnable about its pivotal axis until it lies substantially in said medial plane, a truck supporting the rear of said frame, said truck including a transverse bolster, a transverse cylindrical bar fixed to the lower part of said bolster projecting beyond the ends thereof, opposite independent truck frames, each including a plate journaled on said bar adjacent its middle, a side beam journaled on each projecting end of said bar, and members rigidly connecting said side beams and plate, transverse axles journaled in said side beams at points on opposite sides of said bar and equidistant therefrom, wheels at the ends of said axles, said rigid frame including a transverse beam overlying the projecting ends of said bar, a rear bolster member being fixed to the middle portion of said beam, a longitudinal pivot in said medial plane connecting said rear bolster and bolster support, and jacks fixed to the projecting ends of said bar freely engaging the overlying ends of said beam for leveling said frame.

5. Vehicular carrier for a portable sawmill or the like comprising a rigid frame, a front wheeled axle centrally pivoted upon a vertical axis in a medial longitudinal plane perpendicular to said frame and capable of being turned about said axis until it lies substantially in said plane, a truck supporting the rear of said frame, said truck including a transverse bolster, a transverse cylinder bar fixed to the lower part of said bolster projecting beyond the ends thereof, opposite independent truck frames, each including a plate journaled on said bar adjacent its middle, a side beam journaled on a projecting end of said bar, and members rigidly connecting said side beam and plate, transverse axles journaled in said side beams at points on opposite sides of said bar and equidistant therefrom, wheels at the ends of said axles, said rigid frame including a transverse beam overlying the projecting ends of said bar, a transverse bolster member fixed to the middle portion of said beam projecting downwardly therefrom, a horizontal pivot in said medial plane carrying said bolster and bolster member, and jacks fixed to the projecting ends of said bar, freely engaging the overlying ends of said beam for leveling said frame.

JOHN WILLIAM O'KELLEY.

REFERENCES CITED

The following references are of record in the file of this patent:

UNITED STATES PATENTS

| Number | Name | Date |
|---|---|---|
| 118,257 | Miller | Aug. 22, 1871 |
| 128,667 | Skeen | July 2, 1872 |
| 331,653 | Rickey | Dec. 1, 1885 |
| 407,511 | Burkhart | July 23, 1889 |
| 456,364 | Luger | July 21, 1891 |
| 719,585 | Hanssler | Feb. 3, 1903 |
| 726,165 | Hunt | Apr. 21, 1903 |
| 761,697 | McDonald | June 7, 1904 |
| 778,258 | Martin | Dec. 27, 1904 |
| 865,196 | Martin | Sept. 3, 1907 |
| 913,206 | Ferguson | Feb. 23, 1909 |
| 919,854 | Gross | Apr. 27, 1909 |
| 1,075,918 | Kaylor | Oct. 14, 1913 |
| 1,248,031 | Suckow | Nov. 27, 1917 |
| 1,284,806 | Stahlnacke | Nov. 12, 1918 |
| 1,444,604 | Haney | Feb. 6, 1923 |
| 1,791,406 | Foreman et al. | Feb. 3, 1931 |
| 2,418,726 | Rogers | Apr. 8, 1947 |
| 2,432,253 | Schaeffer | Dec. 9, 1947 |